(12) United States Patent
Li et al.

(10) Patent No.: US 9,784,997 B2
(45) Date of Patent: Oct. 10, 2017

(54) ARRAY SUBSTRATE, DISPLAY DEVICE, AND DRIVING METHOD THEREFOR

(71) Applicant: BOE TECHNOLOGY GROUP CO., LTD., Beijing (CN)

(72) Inventors: Pan Li, Beijing (CN); Wenbo Li, Beijing (CN); Hongfel Cheng, Beijing (CN); Jianbo Xian, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 15/323,844

(22) PCT Filed: Jun. 18, 2015

(86) PCT No.: PCT/CN2015/081726
§ 371 (c)(1),
(2) Date: Jan. 4, 2017

(87) PCT Pub. No.: WO2016/110057
PCT Pub. Date: Jul. 14, 2016

(65) Prior Publication Data
US 2017/0146839 A1    May 25, 2017

(30) Foreign Application Priority Data
Jan. 8, 2015  (CN) .......................... 2015 1 0010272

(51) Int. Cl.
*G02F 1/133* (2006.01)
*G09G 3/20* (2006.01)
(Continued)

(52) U.S. Cl.
CPC .... *G02F 1/13306* (2013.01); *G02F 1/134336* (2013.01); *G02F 1/136286* (2013.01);
(Continued)

(58) Field of Classification Search
CPC .......................... G02F 1/13306; G09G 3/2003
See application file for complete search history.

(56) References Cited

FOREIGN PATENT DOCUMENTS

| CN | 1693945 A | 11/2005 |
|---|---|---|
| CN | 1764865 A | 4/2006 |

(Continued)

OTHER PUBLICATIONS

Search Report and Written Opinion Mailed Sep. 28, 2015 from State Intellectual Property Office of the P.R. China.

(Continued)

*Primary Examiner* — Michael Faragalla
*Assistant Examiner* — Chayce Bibbee
(74) *Attorney, Agent, or Firm* — Dilworth & Barrese, LLP; Michael J. Musella, Esq.

(57) ABSTRACT

An array substrate, a display device, and a driving method therefor are provided. The array substrate includes multiple pixel units, multiple scan signal lines (2), and multiple data signal lines (3). The pixel units comprise multiple subpixels (10). The subpixels (10) include first sub-subpixels (101) and second sub-subpixels (102). The multiple data signal lines (3) form multiple data signal line sets. The data signal line sets include multiple data signal line subsets. The data signal line subsets include first data signal lines (Sm+1) and second data signal lines (Sm). The first sub-subpixels (101) are connected to the first data signal lines (Sm+1) to acquire a first data signal. The second sub-subpixels (102) are connected to the second data signal lines (Sm) to acquire a second data signal. The voltage of the first data signal is a V. The value interval for the voltage of the second data signal is (0.7a V, a V)∪(a V, 1.3a V). Using the driving method, the display device is provided with a wide viewing angle.

20 Claims, 2 Drawing Sheets

(51) Int. Cl.
*G09G 3/36* (2006.01)
*G02F 1/1362* (2006.01)
*G02F 1/1343* (2006.01)
*G02F 1/1368* (2006.01)

(52) U.S. Cl.
CPC ......... *G09G 3/2003* (2013.01); *G09G 3/3677* (2013.01); *G09G 3/3688* (2013.01); *G02F 1/1368* (2013.01); *G02F 1/13624* (2013.01); *G02F 2001/134345* (2013.01); *G02F 2201/121* (2013.01); *G02F 2201/123* (2013.01); *G09G 2300/0426* (2013.01); *G09G 2300/0452* (2013.01); *G09G 2320/028* (2013.01)

(56) References Cited

FOREIGN PATENT DOCUMENTS

| CN | 101221337 A | 7/2008 |
|---|---|---|
| CN | 101271207 A | 9/2008 |
| CN | 101398581 A | 4/2009 |
| CN | 102707525 A | 10/2012 |
| CN | 102879966 A | 1/2013 |
| CN | 102955310 A | 3/2013 |
| CN | 103399439 A | 11/2013 |
| CN | 103529614 A | 1/2014 |
| CN | 103605224 A | 2/2014 |
| CN | 104062790 A | 9/2014 |
| CN | 104238219 A | 12/2014 |
| CN | 204028529 U | 12/2014 |
| CN | 204065626 U | 12/2014 |
| CN | 104503180 A | 4/2015 |
| KR | 20030008044 A | 1/2003 |
| KR | 20080024697 A | 3/2008 |

OTHER PUBLICATIONS

Chinese Office Action mailed Nov. 1, 2016.
Second Chinese Office Action dated Jun. 12, 2017.
Gao Hongjin et al, New Display Technology, Beijing Xinfenghua Color Printing Co., Ltd. Aug. 1, 2017, Beijing.

ARRAY SUBSTRATE, DISPLAY DEVICE, AND DRIVING METHOD THEREFOR

TECHNICAL FIELD

The present disclosure relates to an array substrate, a display device and its driving method.

BACKGROUND

TFT-LCD (Thin Film Transistor-Liquid Crystal Display) has been widely used in the field of display due to its advantages of high brightness, high contrast and so on. However, compared to the conventional CRT (Cathode Ray Tube) display, a viewing angle of LCD is relatively narrow. The viewing angle refers to an angle between a sight line and a plane vertical to the screen when images with a contrast of 10 or more could just be viewing.

The narrow viewing angle brings bad experience to users. For example, when viewing the TFT-LCD from a certain angle, the user may find that brightness of the display is darkened sharply, and it is hard to see high quality images. Obviously, TFT-LCD with the narrow viewing angle cannot satisfy the requirement of watching by multiple users at the same time.

SUMMARY

The embodiments of the present disclosure provide an array substrate, a display device and a driving method of the display device, wherein the display device could have characteristics of the wide viewing angle when being applied the driving method.

In an aspect, an embodiment of the present disclosure provides an array substrate comprising a plurality of pixel units, a plurality of scanning signal lines and a plurality of data signal lines, wherein a pixel unit includes a plurality of subpixels configured to display different colors, a subpixel includes a first sub-subpixel and a second sub-subpixel, the scanning signal lines are configured to input scanning signals to the subpixels, the plurality of data signal lines form a plurality of data signal line sets, a data signal line set includes a plurality of data signal line subsets configured to input data signals to the subpixels, a data signal line subset include a first data signal line and a second data signal line, wherein the first sub-subpixel is connected to the first data signal lines, the first data signal line being configured to input a first data signal to the first sub-subpixel, and the second sub-subpixel is connected to the second data signal lines, the second data signal line being configured to input a second data signal to the second sub-subpixel, and a voltage of the first data signal is aV and a voltage value interval of the second data signal is [0.7aV, aV)∪(aV, 1.3aV], a being a positive number.

In another aspect, an embodiment of the present disclosure provides a display device comprising any one of the array substrates provided by the embodiments of the present disclosure.

In still another aspect, an embodiment of the present disclosure provides a driving method for a display device comprising an array substrate, the array substrate comprising a plurality of pixel units, a plurality of scanning signal lines and a plurality of data signal lines, wherein a pixel unit includes a plurality of subpixels configured to display different colors, a subpixel includes a first sub-subpixel and a second sub-subpixel, the plurality of data signal lines form a plurality of data signal line sets, a data signal line set includes a plurality of data signal line subsets configured to input data signals to the subpixels, wherein a data signal line subset including a first data signal line and a second data signal line, the first sub-subpixel being connected to the first data signal line, the second sub-subpixel being connected to the second data signal line, and the driving method comprises inputting scanning signals to the first sub-subpixel and the second sub-subpixel belonging to the same subpixel through the scanning signal lines within one scanning period, and inputting a data signal through the data signal line sets to the subpixels, wherein a first data signal is inputted through the first data signal line to the first sub-subpixel, a second data signal is inputted the second data signal line to the second sub-subpixel, a voltage of the first data signal is aV and a voltage value interval of the second data signal is [0.7aV, aV)∪(aV, 1.3aV], a being a positive number.

The embodiments of the present disclosure provide an array substrate, a display device and a driving method of the display device. In the driving method for the display device, scanning signals are inputted to the first sub-subpixel and the second sub-subpixel belonging to the same subpixel through the scanning signal lines within one scanning period, data signal are inputted by the data signal line sets to the subpixels, wherein a first data signal is inputted through the first data signal line to the first sub-subpixel, a second data signal is inputted through the second data signal line to the second sub-subpixel, a voltage of the first data signal is aV, and a voltage value interval of the second data signal is [0.7aV, aV)∪(aV, 1.3aV], a being a positive number. As a result, within one subpixel, because a voltage value difference between data signals inputted to the first sub-subpixel and the second sub-subpixel is small and area of each sub-subpixel is small, an image to be displayed by the sub-subpixel inputted with a data signal whose value interval is [0.7aV, aV)∪(aV, 1.3aV) and an image to be displayed by the sub-subpixel inputted with a data signal of aV can be considered as the same image, that is, the two sub-subpixels are adopted to display the image to be displayed by one subpixel.

Meanwhile, since values of the data signals inputted to the sub-subpixels are slightly different from each other, voltages of pixel electrodes of the sub-subpixels are slightly different from each other. Thus, a deflection angle and an orientation of liquid molecules corresponding to different sub-subpixels belonging to the same subpixel are slightly different.

Generally, voltages of pixel electrodes in one subpixel unit are the same, so the deflection angle and orientation of liquid crystal molecules corresponding thereto are the same, so that liquid crystal molecules corresponding to one subpixel unit can form one domain region. Thus, after light passes through one domain region, the deflection angle and the orientation are singular, and the viewing angle is small. And within one subpixel, the deflection angle and orientation of liquid crystal molecules corresponding to different sub-subpixels are slightly different, then a plurality of domain regions can be formed in a liquid crystal region corresponding to the subpixels that include a plurality of sub-subpixels. The deflection angles and orientations in different domain regions are slightly different, so that after light passes through the different domain regions, the light will have a plurality of deflection angles and orientations, that is, the viewing angle is improved. The display device adopting this display method can realize multi-domain displaying, and when viewing the display screen from different angles, compensation from the corresponding direction can be obtained, and the display screen has characteristics of the wide viewing angle.

DETAILED DESCRIPTION OF THE EMBODIMENTS

Hereinafter, the technical solutions in the embodiments of the present disclosure will be described clearly and comprehensively in combination with the drawings, obviously, these described embodiments are parts of the embodiments of the present disclosure, rather than all of the embodiments thereof, all the other embodiments obtained by those of ordinary skill in the art based on the embodiments of the present disclosure without paying creative efforts fall into the protection scope of the present disclosure.

Figure 1:
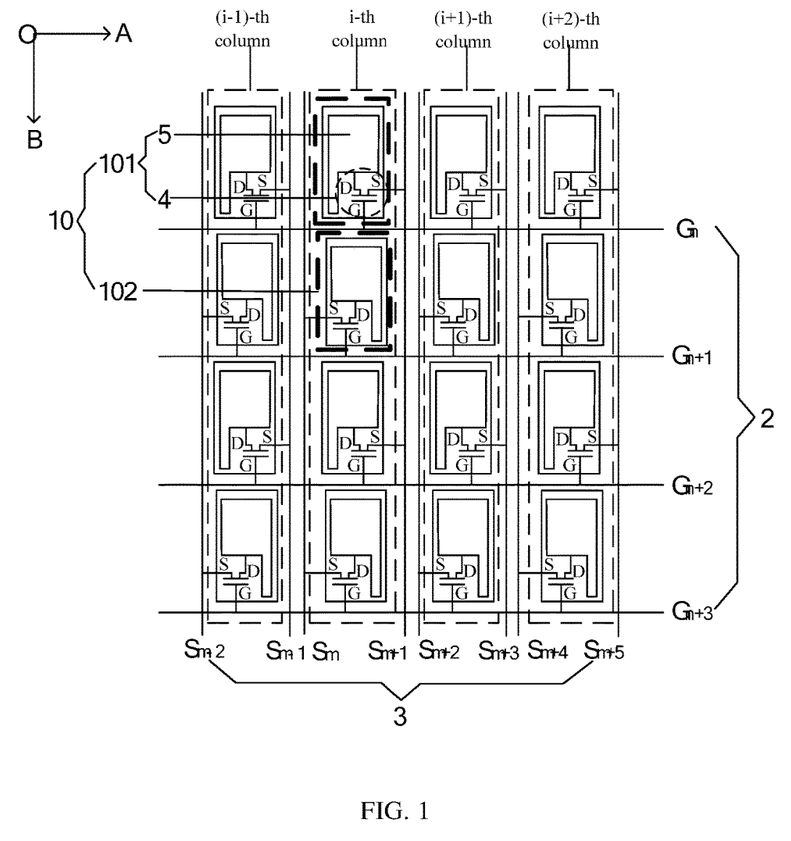
FIG. 1 is an array substrate provided by an embodiment of present disclosure.

An embodiment of the present disclosure provides an array substrate, referring to FIG. 1, the array substrate comprises a plurality of pixel units (not shown), a plurality of scanning signal lines 2 and a plurality of data signal lines 3. A pixel unit includes a plurality of subpixels 10 configured to display different colors, and a subpixel 10 includes a first sub-subpixel 101 and a second sub-subpixel 102. The scanning signal lines 2 are configured to input scanning signals to the subpixels 10. The plurality of data signal lines 3 form a plurality of data signal line sets. A data signal line set includes a plurality of data signal line subsets. A data signal line subset is configured to input a data signal to the subpixel 10, and includes a first data signal line and a second data signal line.

The first sub-subpixel 101 is connected to a first data signal line, i.e., the data signal line Sm+1 in FIG. 1, and the first data signal line is configured to input a first data signal to the first sub-subpixel 101. The second sub-subpixel 102 is connected to a second data signal line, i.e., the data signal line Sm in FIG. 1, and the second data signal line is configured to input a second data signal to the second sub-subpixel 102. A voltage of the first data signal is aV, and a voltage value interval of the second data signal is [0.7aV, aV)∪(aV, 1.3aV], a being a positive number.

In the array substrate described above, an embodiment of the present disclosure makes no limitations to the number and type of subpixels included in a pixel unit, and a pixel unit generally includes a red subpixel, a green subpixel and a blue subpixel for displaying three colors of red, green and blue, respectively. Of course, in order to improve brightness of displaying, the pixel unit may also include a white subpixel or a yellow subpixel, according to the actual situations.

In the array substrate described above, the voltage value interval of the second data signal is [0.7aV, aV)∪(aV, 1.3aV), i.e., the voltage value interval of the second data signal may be [0.7aV, aV), and exemplarily, the voltage of the second data signal may be, for example, 0.75aV, 0.8aV or 0.9aV. Also, the voltage of the second data signal may be (aV, 1.3aV], and exemplarily, the voltage of the second data signal may be, for example, 1.1aV, 1.2aV or 1.25aV.

Further, the voltage value interval of the second data signal is [0.7aV, 0.9aV)∪(1.1aV, 1.3aV], a being a positive number. In this way, a more appropriate data voltage difference is formed between the sub-subpixels, through which the wide viewing angle can be achieved better and effect of images displayed by the sub-subpixels can be better.

In an embodiment of the present disclosure, a subpixel including a first sub-subpixel and a second sub-subpixel can comprise any one of the subpixels of a pixel unit including a first sub-subpixel and a second sub-subpixel. That is, taking a red subpixel as example, only the red subpixel within a pixel unit includes a first red sub-subpixel and a second red sub-subpixel, and subpixels for other colors may correspondingly have only one sub-subpixel each. A subpixel including a first sub-subpixel and a second sub-subpixel can also comprise each of the subpixels of a pixel unit including a first sub-subpixel and a second sub-subpixel. That is, taking such an example that a pixel unit includes red subpixels, green subpixels and blue subpixels, the pixel unit includes six sub-subpixels, that is, a first red sub-subpixel, a second red sub-subpixel, a first green sub-subpixel, a second green sub-subpixel, a first blue sub-subpixel and a second blue sub-subpixel. A subpixel including a first sub-subpixel and a second sub-subpixel can also comprise a part of the subpixels of a pixel unit including a first sub-subpixel and a second sub-subpixel each while a part of the subpixels of the pixel unit including only one sub-subpixel each. In an embodiment of the present disclosure, for example, each subpixel of the pixel unit includes a first sub-subpixel and a second sub-subpixel. The embodiments and the drawings of the present disclosure illustrate in detail with the subpixel for one color as example.

Further, in an embodiment of the present disclosure, a pixel unit includes a plurality of subpixels configured to display different colors, a subpixel includes a first sub-subpixel and a second sub-subpixel, and correspondingly, a plurality of data signal lines form a plurality of data signal line sets, and a data signal line set includes a plurality of data signal line subsets. That is, in an embodiment of the present disclosure, a data line set inputs data signals to respective subpixels of a pixel unit, and a data signal line subset inputs data signals respectively to the first sub-subpixel and the second sub-subpixel belonging to the same subpixel.

A voltage of the first data signal is aV, and a voltage value interval of the second data signal is [0.7aV, aV)∪(aV, 1.3aV]. That is, the second data signal and the first data signal are different, and the voltage difference between second data signal and the first data signal is small.

Figure 2:
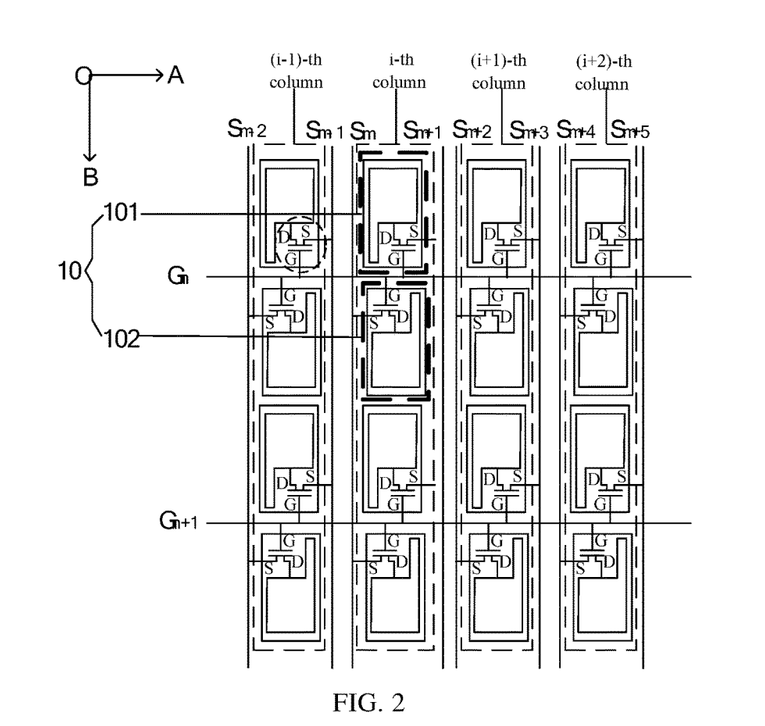
FIG. 2 is another array substrate provided by another embodiment of present disclosure.

In addition, embodiments of the present disclosure make no limitations to the arrangement of the data signal lines and the scanning signal lines. Exemplarily, the data signal lines may, for example, be formed into a plurality of columns along a direction OB shown in FIGS. 1-2, and the plurality of scanning signal lines may, for example, be formed into a plurality of rows along a direction OA shown in FIGS. 1-2. Alternatively, the plurality of data signal lines may also be formed into a plurality of rows along a direction OA shown in FIGS. 1-2, and the plurality of scanning signal lines may also be formed into a plurality of columns along a direction OB shown in FIGS. 1-2, an embodiment of the present disclosure makes no limitations thereto. Referring to FIGS. 1-2, the embodiments and the drawings of the present disclosure illustrate examples wherein the plurality of data signal lines are formed into a plurality of columns along the direction OB shown in FIGS. 1-2 and the plurality of scanning signal lines are formed into a plurality of rows along the direction OA shown in FIG. 1-2.

Embodiments of the present disclosure make no limitations to the arrangement of the sub-subpixels belonging to the same subpixel, and the arrangement may be determined according to actual needs. The embodiments and the drawings of the present disclosure illustrate examples wherein the plurality of data lines are formed into a plurality of columns along the direction OB shown in FIGS. 1-2 and the plurality of scanning signal lines are formed into a plurality of rows along the direction OA shown in FIGS. 1-2, and the sub-subpixels belong to the same subpixel are located in the same column.

An embodiment of the present disclosure provides an array substrate, wherein one subpixel in this array substrate includes a first sub-subpixel and a second sub-subpixel, the first sub-subpixel obtains a first data signal through a first data signal line and a second sub-subpixel obtains a second data signal through a second data signal line. By means of setting a voltage value of the first data signal and a voltage value of the second data signal so that a value of a data signal inputted to the first sub-subpixel and a value of a data signal inputted to the second sub-subpixel is different slightly and then a voltage of a pixel electrode of each sub-subpixel slightly differs from each other, when applying this array substrate to form a liquid crystal display device, deflection directions and orientations of liquid crystal molecules corresponding to different sub-subpixels that belong to the same subpixel are different slightly, and then a plurality of domain regions may be formed in a liquid crystal region corresponding to the subpixel that includes a plurality of sub-subpixels. Thus, such a display device can achieve multi-domain displaying, and the viewing angle of the display device can be increased.

Further, a sub-subpixel includes one Thin Film Transistor (TFT) and one pixel electrode, wherein a drain D of the TFT is connected to the pixel electrode and a source of the TFT is connected to one data signal line. Exemplarily, referring to FIG. 1, taking the first sub-subpixel as example, the first sub-subpixel 101 includes one TFT 4 and one pixel electrode 5, wherein a drain D of the TFT 4 is connected to the pixel electrode 5, and a source S of the TFT 4 is connected to the first data signal line, i.e., the data signal line Sm+1 in FIG. 1.

Optionally, the first sub-subpixel and the second sub-subpixel are adjacent and located in the same line along a direction of the data signal line. Here, it should be noted that, in a case where the plurality of scanning signal lines are formed into a plurality of rows and the plurality of data signal lines are formed into a plurality of columns, the first sub-subpixel and the second sub-subpixel being adjacent and located in the same line along a direction of the data signal lines can refer to, in an example, that the first sub-subpixel and the second sub-subpixel are adjacent and located in the same column. Alternatively, in a case where the plurality of scanning signal lines are formed into a plurality of columns and the plurality of data signal lines are formed into a plurality of rows, the first sub-subpixel and the second sub-subpixel being adjacent and located in the same line along a direction of the data signal lines can refer to, in an example, that the first sub-subpixel and the second sub-subpixel are adjacent and located in the same row.

In a case where the plurality of scanning signal lines are formed into a plurality of rows and the plurality of data signal lines are formed into a plurality of columns, referring to FIG. 1, the first sub-subpixel 101 and the second sub-subpixel 102 are located in the same column along the direction OB. Then, a deflection angle of liquid crystal molecules corresponding to the first sub-subpixel 101 and a deflection angle of liquid crystal molecules corresponding to the second sub-subpixel 102 are different, through which multi-domain of the display device along the direction of the data signal lines can be achieved.

In a case where the plurality of scanning signal lines are formed into a plurality of columns and the plurality of data signal lines are formed into a plurality of rows, the first sub-subpixel and the second sub-subpixel are located in the same row. Then, a deflection angle of liquid crystal molecules corresponding to the first sub-subpixel 101 and a deflection angle of liquid crystal molecules corresponding to the second sub-subpixel 102 are different, through which multi-domain of the display device along the direction of the scanning signal lines can be achieved.

Optionally, the first data signal line and the second data signal line are disposed separately at two sides of the subpixels. It needs to be noted that, in a case where the plurality of scanning signal lines are formed into a plurality of rows and the plurality of data signal lines are formed into a plurality of columns, when the first sub-subpixel and the second sub-subpixel are adjacent and located in the same row, the first data signal line may be disposed at a side not adjacent to the second sub-subpixel of the first sub-subpixel, and the second data signal line may be disposed at a side not adjacent to the first sub-subpixel of the second sub-subpixel; when the first sub-subpixel and the second sub-subpixel are adjacent and located in the same column, the first data signal line and the second data signal line may be disposed at two sides of the first sub-subpixel or the second sub-subpixel.

Alternatively, in a case where the plurality of scanning signal lines are formed into a plurality of columns and the plurality of data signal lines are formed into a plurality of rows, when the first sub-subpixel and the second sub-subpixel are adjacent and located in the same row, the first data signal line and the second data signal line may be disposed at two sides of the first sub-subpixel or the second sub-subpixel; when the first sub-subpixel and the second sub-subpixel are adjacent and located in the same column, the first data signal line may be disposed at a side not adjacent to the second sub-subpixel of the first sub-subpixel, the second data signal line may be disposed at a side not adjacent to the first sub-subpixel of the second sub-subpixel.

The embodiments and the drawings of the present disclosure illustrate examples in a case where the plurality of scanning signal lines are formed into a plurality of rows and the plurality of data signal lines are formed into a plurality of columns, and wherein the first sub-subpixel and the second sub-subpixel are adjacent and located in the same column, and the first data signal line and the second data signal line are disposed at two sides of the first sub-subpixel or the second sub-subpixel.

Hereinafter, the advantageous effect of disposing separately the first data signal lines and the second data signal lines at two sides of the subpixels will be described by considering an example in a case where the plurality of scanning signal lines are formed into a plurality of rows and the plurality of data signal lines are formed into a plurality of columns and wherein the first sub-subpixels and the second sub-subpixels are adjacent and located in the same column and the first data signal line and the second data signal line are disposed at two sides of the first sub-subpixels or the second sub-subpixels.

Referring to FIG. 1, the plurality of data signal lines are formed into a plurality of columns along the direction OB and the plurality of scanning signal lines are formed into a plurality of rows along the direction OA, and the first sub-subpixel 101 and the second sub-subpixel 102 are adjacent and located in the same column. In a case where an m-th data signal line Sm (i.e., the second data line) and an (m+1)-th data signal line Sm+1 (i.e., the first data signal line) are located at two sides of the pixel unit in an i-th column, the first sub-subpixel 101 and the second sub-subpixel 102 belonging to the same subpixel 10 in the pixel unit in the i-th column can be directly connected to either the m-th data signal line Sm or the (m+1)-th data signal line Sm+1. Thus, when the m-th data signal line Sm and the (m+1)-th data signal line Sm+1 are located at the same side of the pixel unit in the i-th column, one sub-subpixel in the pixel unit in the i-th column, which belong to the same subpixel, can be avoided to cross the m-th data signal line Sm or the (m+1)-th data signal line Sm+1, and the problem of cross-connection with the m-th data signal line Sm or the (m+1)-th data signal line Sm+1 can be avoided.

Optionally, areas of the first sub-subpixel and the second sub-subpixel can be different. In this way, input a relatively small voltage signal, e.g., 0.7aV, can be input to a sub-subpixel with a relatively large area. Since the area of a sub-subpixel is proportional to the time required to charge the sub-subpixel, the larger a sub-subpixel is, the faster it can be charged, and thus charge time of sub-subpixels can be saved and a response speed of the array substrate can thereby be improved.

Optionally, a width of a first data signal line and a width of a second data signal line are different. And further, widths of the first data signal line and the second data signal line may be in proportional to a magnitude of a voltage inputted thereto. That is, if a voltage of a first data signal inputted to the first data signal line is greater than a voltage of a second data signal inputted to the second data signal line, the width of the first data line is larger than the width of the second data line. And a resistance of a data line is inversely proportional to area of a cross-section obtained by cutting the data line along a direction perpendicular to a signal transmission direction. In a case where a length of a data line is constant, if the width is increased, area of the cross-section will increase, and then the resistance value decreases. In a case where the length of the first data line and the length of the second data line are constant and the same, when the width of the first data line is larger than the width of the second data line, then the resistance value of the first data line is smaller than the resistance value of the second data line, which facilitates transmitting the first data signal by the first data line more rapidly.

Optionally, a subpixel further includes a third sub-subpixel and a fourth sub-subpixel, and the data signal line subset further include a third data signal line and a fourth data signal line, wherein the third sub-subpixel is connected to the third data signal line, the third data signal line being configured to input a third data signal to the third sub-subpixels, and the fourth sub-subpixel is connected to the fourth data signal lines, the fourth data signal line being configured to input a fourth data signal to the fourth sub-subpixels, and wherein a voltage value range of the third data signal and the fourth data signal is 0.7aV to 1.3aV, a being a positive number.

In this way, more domain regions can be formed in a liquid crystal region corresponding to the subpixel that includes four sub-subpixels, and display effect of the liquid crystal display device employing the array substrate is further improved.

Optionally, in order to make full use of space resources, in a case where the plurality of scanning signal lines are formed into a plurality of rows and the plurality of data signal lines are formed into a plurality of columns, the first sub-subpixel, the second sub-subpixel, the third sub-subpixel and the fourth sub-subpixel are located in two adjacent rows along a direction of the scanning signal lines and located in two adjacent columns along a direction of the data signal lines.

Alternatively, in a case where the plurality of scanning signal lines are formed into a plurality of columns and the plurality of data signal lines are formed into a plurality of rows, the first sub-subpixel, the second sub-subpixel, the third sub-subpixel and the fourth sub-subpixel are located in two adjacent columns along a direction of the scanning signal lines and located in two adjacent rows along a direction of the data signal lines.

Exemplarily, a voltage of the third data signal, a voltage of the fourth data signal and a voltage of the second data signal are different from each other, so that a pixel electrode of the second sub-subpixels, a pixel electrode of the third sub-subpixels and a pixel electrode of the fourth sub-subpixels are different. Thus, at least four domain regions can be formed in a liquid crystal region corresponding to the subpixel that includes the aforesaid sub-subpixels so that, when light passes through the liquid crystal, the deflection angle and the orientations are further increased, which further improves the viewing angle.

Alternatively, a width of a first data signal line, a width of a second data signal line, a width of a third data signal line and a width of a fourth data line are different from each other. That is, on the basis that voltages of the first data signal, the second signal, the third data signal and the fourth data signal are different from each other, widths of the data signal lines corresponding respectively to them are also different. Exemplarily, a width of a data signal line may be proportional to a magnitude of the voltage inputted thereto. Reference may be made to the description of the first data signal line and the second data signal line, no more details are described herein.

Optionally, areas of the first, second, third and fourth sub-subpixels are different. In this way, a relatively small voltage signal, e.g., 0.7aV, can be input to a sub-subpixel with a relatively large area. And since area of a sub-subpixel is proportional to the time required to charge the sub-subpixel, the larger a sub-subpixel is, the faster it can be charged. Thus, charge time of sub-subpixels can be saved, and a response speed of the array substrate can thereby be improved.

Optionally, in order to reduce the number of scanning signal lines and save cost, in a case where the plurality of scanning signal lines are formed into a plurality of rows and the plurality of data signal lines are formed into a plurality of columns, exemplarily, as shown in FIG. 2, the first sub-subpixel 101 and the second sub-subpixel 102 located in two adjacent rows and in the same column and belonging to the same subpixel 10 are inputted with a scanning signal through the same scanning signal line Gn. Alternatively, in a case where the plurality of scanning signal lines are formed into a plurality of columns and the plurality of data signal lines are formed into a plurality of rows, sub-subpixels located in two adjacent columns and in the same row and belonging to the same subpixel are inputted with a scanning signal through the same scanning signal line.

Descriptions are provided above with one subpixel including a first sub-subpixel and a second sub-subpixel as example. Of course, an embodiment of the present disclosure is not limited thereto. For example, one subpixel may include a plurality of sub-subpixels. Then, in a case where the plurality of scanning signal lines are formed into a plurality of rows and the plurality of data signal lines are formed into a plurality of rows, sub-subpixels in any two adjacent rows and in the same column may be inputted with the scanning signal through one scanning signal line. Exemplarily, one subpixel may also include a first sub-subpixel, a second sub-subpixel, a third sub-subpixel and a fourth sub-subpixel located in the same column and adjacent successively, then the first sub-subpixel and the second sub-subpixel may be inputted with a scanning signal through one scanning signal line, and the third sub-subpixel and the fourth sub-subpixel may be inputted with a scanning signal through one scanning signal line, that is, four sub-subpixels are inputted with a scanning signal through two scanning signal lines. For the case where the plurality of scanning signal lines are formed into a plurality of columns and the plurality of data signal lines are formed into a plurality of rows, it is the same as that described above, and no more details are repeated herein.

An embodiment of the present disclosure provides a display device comprising any of the array substrates described above, and the display device may be a liquid crystal display and any product or component with a liquid crystal display function, such as a television, a digital camera, a mobile phone, a tablet computer or the like including a liquid crystal display component.

Further, the display device further comprises a common electrode corresponding to the pixel unit, and voltages of common electrodes corresponding to the subpixels of the pixel unit are the same. It should be noted that the liquid crystal display device generally controls the deflection angle of the liquid crystal molecules by means of separately applying voltages to the common electrodes and the pixel electrodes, and controlling a magnitude of an electric field generated between the common electrodes and the pixel electrodes, so as to make light transmittance vary, and thereby achieve displaying. That is, in an embodiment of the present disclosure, voltages of the common electrodes corresponding to the subpixels in the liquid crystal display device are the same, so that voltages of the first sub-subpixel and the second sub-subpixel are made different to make the deflection angle of the liquid crystal molecules corresponding to the first sub-subpixel and the second sub-subpixel be different, so that multi-domain is realized.

An embodiment of the present disclosure provides a driving method for a display device comprising an array substrate. The array substrate comprises a plurality of pixel units, a plurality of scanning signal lines and a plurality of data signal lines, wherein a pixel unit includes a plurality of subpixels configured to display different colors, a subpixel includes a first sub-subpixel and a second sub-subpixel, and wherein the plurality of data signal lines forming a plurality of data signal line sets, a data signal line set includes a plurality of data signal line subsets configured to input a data signal to the subpixels, and a data signal line subset includes a first data signal line and a second data signal line, and wherein the first sub-subpixel is connected to the first data signal line and the second sub-subpixel is connected to the second data signal line.

The driving method comprises inputting scanning signals by the scanning signal lines to the first sub-subpixel and the second sub-subpixel belonging to the same subpixel within one scanning period, inputting data signals by the data signal line sets to the subpixels, wherein a first data signal is inputted by the first data signal line to the first sub-subpixel, a second data signal is inputted by the second data signal line to the second sub-subpixel, and wherein a voltage of the first data signal is aV, and a voltage value interval of the second data signal is [0.7aV, aV)∪(aV, 1.3aV], a being a positive number.

The scanning period is a time period during which a scanning signal is inputted by the scan signal lines to the first sub-subpixel and the second sub-subpixel. In the driving method for the display device, scanning signals are inputted by the scanning signal lines to the first sub-subpixel and the second sub-subpixel belonging to the same subpixel within one scanning period, and data signals are inputted by the data signal line sets to the subpixels, wherein a first data signal is inputted by the first data signal line to the first sub-subpixel and a second data signal is inputted by the second data signal line to the second sub-subpixel, and wherein a voltage of the first data signal is aV, and a voltage value interval of the second data signal is [0.7aV, aV)∪(aV, 1.3aV], a being a positive number. As a result, within one subpixel, because a voltage value difference between the data signal inputted to a first sub-subpixel and the data signal inputted to a second sub-subpixel is small and area of each sub-subpixel is small, it may be considered that an image to be displayed by a sub-subpixel inputted with a data signal whose value interval is [0.7aV, aV)∪(aV, 1.3aV) and an image to be displayed by a sub-subpixel inputted with a data signal of aV are the same image, that is, two sub-subpixels are adopted to display the image to be displayed by one subpixel.

Meanwhile, since values of the data signals inputted to sub-subpixels are slightly different, voltages of pixel electrodes of sub-subpixel slightly different. In this way, a deflection angle and an orientation of liquid molecules corresponding to different sub-subpixels that belong to the same subpixel are slightly different.

Generally, voltages of pixel electrodes in one subpixel unit are the same, and the deflection angle and the orientation of liquid crystal molecules corresponding thereto are the same, and thus liquid crystal molecules corresponding to one subpixel unit can form one domain region, and after light passes through one domain region, the deflection angle and the orientation are singular, the viewing angle is small. And within one subpixel, the deflection angle and the orientation of liquid crystal molecules corresponding to different sub-subpixels are slightly different, then a plurality of domain regions can be formed in a liquid crystal region corresponding to the subpixel that includes a plurality of sub-subpixels, the deflection angles and the orientations in different domain regions are slightly different, so that after light passes through the different domain regions, the light will have a plurality of deflection angles and orientations, that is, the viewing angle is improved. A display device using this display method can realize multi-domain displaying, and when viewing the display screen from different angles, compensation from the corresponding direction can be obtained, the display screen has characteristics of the wide viewing angle.

Optionally, the subpixel further includes a third sub-subpixel and a fourth sub-subpixel, and the data signal line subset further includes a third data signal line and a fourth data signal line, wherein the third sub-subpixel is connected to the third data signal line, the third data signal line being configured to input a third data signal to the third sub-subpixels, and the fourth sub-subpixel is connected to the fourth data signal line, the fourth data signal line being configured to input a fourth data signal to the fourth sub-subpixels, and wherein voltage value ranges of the third data signal and the fourth data signal are 0.7aV to 1.3aV, a being a positive number.

It needs to be noted that, voltage value ranges of the third data signal and the fourth data signal are 0.7aV to 1.3aV, a being a positive number, that is, a voltage value range of the third data signal is 0.7aV to 1.3aV, and a voltage value range of the fourth data signal is 0.7aV to 1.3aV. A voltage value of the third data signal and a voltage value of the fourth data signal may be either the same or different. For example, a voltage of the third data signal is 0.9aV and a voltage of the fourth data signal is 0.8aV, or a voltage of the third data signal and a voltage of the fourth data signal are both 0.9aV. An embodiment of the present disclosure makes no limitations thereto. Exemplarily, a voltage value of the third data signal and a voltage value of the fourth data signal are different, and thus, the number of domain regions formed in a liquid crystal region corresponding to the subpixel that includes the aforesaid sub-subpixels can be increased, which further improves the viewing angle.

Further, exemplarily, a voltage of the third data signal, a voltage of the fourth data signal and a voltage of the second data signal are different from each other. Thus, at least four domain regions can be formed in a liquid crystal region corresponding to the subpixel that includes the aforesaid sub-subpixels, so that when light passes through the liquid crystal, the deflection angle and the orientations are further increased, which further improves the viewing angle.

Next, the above driving method will be explained taking as example the display device comprising the array substrate as shown in FIG. 1. The driving method exemplarily comprises the following steps.

Figure 3:
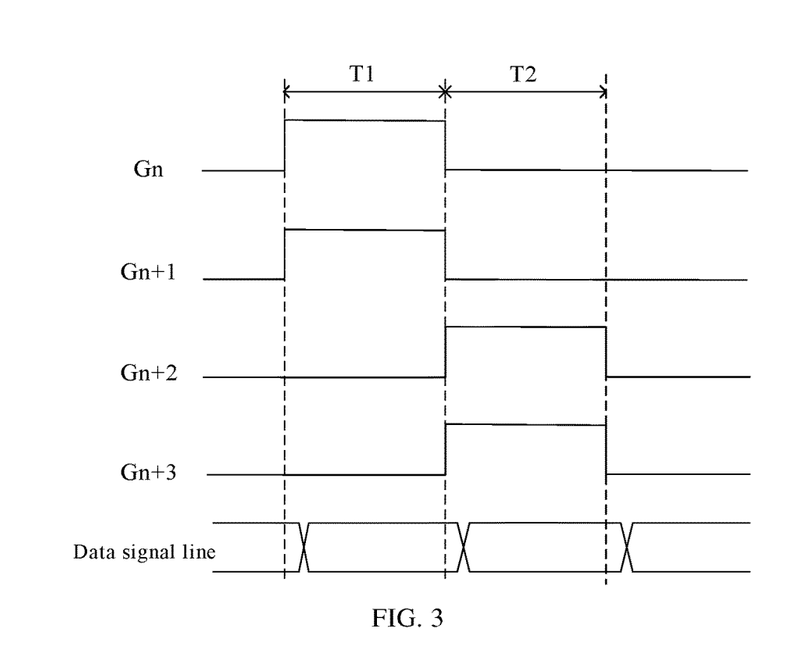
FIG. 3 is an operation timing diagram of FIG. 1.

As shown in FIG. 3, in a first scanning period T1, a scanning voltage is inputted to the scanning signal line Gn connected to the gate of the thin film transistor of the first sub-subpixel in the first row, and meanwhile, a scanning voltage is inputted to the scanning signal line Gn+1 connected to the gate of the thin film transistor of the second sub-subpixel in the second row.

A data signal is inputted to eight data signal lines Sm−2 to Sm+5 at the same time, wherein aV is inputted to the data signal line Sm−1 connected to the source of the thin film transistor of the first sub-subpixel in the (i−1)-th column, and 0.8aV is inputted to the data signal line data signal line Sm−2 connected to the source of the thin film transistor of the second sub-pixel in the (i−1)-th column;

bV is inputted to the data signal line data signal Sm+1 connected to the source of the thin film transistor of the first sub-subpixel in the i-th column, and 0.8bV is inputted to the data signal line Sm connected to the source of the thin film transistor of the second sub-subpixel in the i-th column;

cV is inputted to the data signal line Sm+3 connected to the source of the thin film transistor of the first sub-subpixel in the (i+1)-th column, and 0.8cV is inputted to the data signal line Sm+2 connected to the source of the thin film transistor of the second sub-subpixel in the (i+1)-th column;

dV is inputted to the data signal line Sm+5 connected to the source of the thin film transistor of the first sub-subpixel in the (i+2)-th column, and 0.8dV is inputted to the data signal line Sm+4 connected to the source of the thin film transistor of the second sub-subpixel in the (i+2) column;

wherein i, m and n are positive integers, and a, b, c and d are positive numbers.

As shown in FIG. 3, in a second scanning period T2, a scanning voltage is inputted to the scanning signal line Gn+2 connected to the gate of the thin film transistor of the first sub-subpixel in the third row, and meanwhile, a scanning voltage is inputted to the scanning signal line Gn+3 connected to the gate of the thin film transistor of the second sub-subpixel in the fourth row.

A data signal is inputted to eight data signal lines Sm−2 to Sm+5 at the same time, wherein fV is inputted to the data signal line Sm−1 connected to the source of the thin film transistor of the first sub-subpixel in the (i−1)-th column, and 0.8fV is inputted to the data signal line data signal line Sm−2 connected to the source of the thin film transistor of the second sub-pixel in the (i−1)-th column;

gV is inputted to the data signal line data signal Sm+1 connected to the source of the thin film transistor of the first sub-subpixel in the i-th column, and 0.8gV is inputted to the data signal line Sm connected to the source of the thin film transistor of the second sub-subpixel in the i-th column;

hV is inputted to the data signal line Sm+3 connected to the source of the thin film transistor of the first sub-subpixel in the (i+1)-th column, and 0.8hV is inputted to the data signal line Sm+2 connected to the source of the thin film transistor of the second sub-subpixel in the (i+1)-th column;

jV is inputted to the data signal line Sm+5 connected to the source of the thin film transistor of the first sub-subpixel in the (i+2)-th column, and 0.8jV is inputted to the data signal line Sm+4 connected to the source of the thin film transistor of the second sub-subpixel in the (i+2) column;

wherein i, m and n are positive integers, and f, g, h and j are positive numbers.

Thus, the above steps are repeated in different scanning periods so as to achieve scanning from the first row to the last row, and thereby implement one time of displaying of the image within one scanning cycle. When repetition is made to complete multiple scanning cycles, continuous image displaying can be implemented.

As will be appreciated, the above description merely is provided with that one subpixel includes a first sub-subpixel and a second sub-subpixel as example. The driving method in a case where one subpixel includes a plurality of sub-subpixels is the same as the above, and no more details are repeated herein.

The above described are merely some embodiments of the present disclosure, however, the protection scope of the present disclosure is limited thereto, modifications or replacements that are easily conceivable for those skilled in the art within the technique range disclosed in the present disclosure should all fall into the protection scope of the present disclosure. The protection scope of the present disclosure is defined by the appended claims.

The present application claims the priority of the Chinese patent application No. 201510010272.4 filed on Jan. 8, 2015, which is incorporated as part of the present application by reference herein in its entirety.

What is claimed is:
1. An array substrate, comprising a plurality of pixel units, a plurality of scanning signal lines and a plurality of data signal lines, wherein
a pixel unit includes a plurality of subpixels configured to display different colors, and a subpixel includes a first sub-subpixel and a second sub-subpixel, the scanning signal lines are configured to input scanning signals to the subpixels, the plurality of data signal lines form a plurality of data signal line sets, a data signal line set includes a plurality of data signal line subsets configured to input data signals to the subpixels, and a data signal line subset include a first data signal line and a second data signal line,
the first sub-subpixel is connected to a first data signal line, the first data signal line being configured to input a first data signal to the first sub-subpixel, and the second sub-subpixel is connected to the second data signal line, the second data signal line being configured to input a second data signal to the second sub-subpixel, and a voltage of the first data signal is aV and a voltage value interval of the second data signal is [0.7aV, aV)∪(aV, 1.3aV], a being a positive number.

2. The array substrate according to claim 1, wherein the first sub-subpixel and the second sub-subpixel are adjacent to each other and are located in the same line along a direction of the data signal lines.

3. The array substrate according to claim 2, wherein the first data signal line and the second data signal line are disposed separately at two sides of the subpixels.

4. The array substrate according to claim 2, wherein area of the first sub-subpixel and area of the second sub-subpixel are different.

5. The array substrate according to claim 2, wherein
a subpixel further includes a third sub-subpixel and a fourth sub-subpixel, and a data signal line subset further includes a third data signal line and a fourth data signal line, and
the third sub-subpixel is connected to the third data signal line, the third data signal line being configured to input a third data signal to the third sub-subpixels, the fourth sub-subpixel is connected to the fourth data signal line, the fourth data signal line being configured to input a fourth data signal to the fourth sub-subpixels, and voltage value ranges of the third data signal and the fourth data signal are from 0.7aV to 1.3aV, a being a positive number.

6. The array substrate according to claim 2, wherein
in a case where the plurality of scanning signal lines are formed into a plurality of rows and the plurality of data signal lines are formed into a plurality of columns, sub-subpixels located in two adjacent rows and in the same column and belonging to the same subpixel are inputted with scanning signals through the same scanning signal line, and
in a case where the plurality of scanning signal lines are formed into a plurality of columns and the plurality of data signal lines are formed into a plurality of rows, sub-subpixels located in two adjacent columns and in the same row and belonging to the same subpixel are inputted with scanning signals through the same scanning signal line.

7. The array substrate according to claim 1, wherein the first data signal line and the second data signal line are disposed separately at two sides of the subpixels.

8. The array substrate according to claim 1, wherein area of the first sub-subpixel and area of the second sub-subpixel are different.

9. The array substrate according to claim 1, wherein
a subpixel further includes a third sub-subpixel and a fourth sub-subpixel, and a data signal line subset further includes a third data signal line and a fourth data signal line, and
the third sub-subpixel is connected to the third data signal line, the third data signal line being configured to input a third data signal to the third sub-subpixels, the fourth sub-subpixel is connected to the fourth data signal line, the fourth data signal line being configured to input a fourth data signal to the fourth sub-subpixels, and voltage value ranges of the third data signal and the fourth data signal are from 0.7aV to 1.3aV, a being a positive number.

10. The array substrate according to claim 9, wherein
in a case where the plurality of scanning signal lines are formed into a plurality of rows and the plurality of data signal lines are formed into a plurality of columns, the first sub-subpixel, the second sub-subpixel, the third sub-subpixel and the fourth sub-subpixel are located in two adjacent rows along a direction of the scanning signal lines and located in two adjacent columns along a direction of the data signal lines, and
in a case where the plurality of scanning signal lines are formed into a plurality of columns and the plurality of data signal lines are formed into a plurality of rows, the first sub-subpixel, the second sub-subpixel, the third sub-subpixel and the fourth sub-subpixel are located in two adjacent columns along a direction of the scanning signal lines and located in two adjacent rows along a direction of the data signal lines.

11. The array substrate according to claim 9, wherein a voltage of the third data signal, a voltage of the fourth data signal and a voltage of the second data signal are different from each other.

12. The array substrate according to claim 9, wherein area of the first sub-subpixels, area of the second sub-subpixels, area of the third sub-subpixels and area of the fourth sub-subpixels are different from each other.

13. The array substrate according to claim 1, wherein
in a case where the plurality of scanning signal lines are formed into a plurality of rows and the plurality of data signal lines are formed into a plurality of columns, sub-subpixels located in two adjacent rows and in the same column and belonging to the same subpixel are inputted with scanning signals through the same scanning signal line, and
in a case where the plurality of scanning signal lines are formed into a plurality of columns and the plurality of data signal lines are formed into a plurality of rows, sub-subpixels located in two adjacent columns and in the same row and belonging to the same subpixel are inputted with scanning signals through the same scanning signal line.

14. A display device, comprising the array substrate according to claim 1.

15. The display device according to claim 14, wherein the display device further comprises a common electrode corresponding to the pixel unit, and voltages of common electrodes corresponding to subpixels of the pixel unit are the same.

16. The display device according to claim 14, wherein in the array substrate, the first sub-subpixel and the second sub-subpixel are adjacent to each other and are located in the same line along a direction of the data signal lines.

17. The display device according to claim 14, wherein in the array substrate, the first data signal line and the second data signal line are disposed separately at two sides of the subpixels.

18. A driving method for a display device, the display device comprising an array substrate including a plurality of pixel units, a plurality of scanning signal lines and a plurality of data signal lines, wherein a pixel unit includes a plurality of subpixels configured to display different colors, a subpixel includes a first sub-subpixel and a second sub-subpixel, the plurality of data signal lines form a plurality of data signal line sets, a data signal line set includes a plurality of data signal line subsets configured to input data signals to the subpixels, and a data signal line subset includes a first data signal line and a second data signal line, the first sub-subpixel being connected to the first data signal lines and the second sub-subpixel being connected to the second data signal lines, and the driving method comprising
inputting scanning signals to the first sub-subpixel and the second sub-subpixel belonging to the same subpixel through the scanning signal lines within one scanning period, and
inputting data signals through the data signal line sets to the subpixels, wherein a first data signal is inputted through the first data signal line to the first sub-subpixel, a second data signal is inputted through the second data signal line to the second sub-subpixel, a voltage of the first data signal is aV and a voltage value interval of the second data signal is [0.7aV, aV)∪(aV, 1.3aV], a being a positive number.

19. The driving method according to claim 18, wherein a subpixel further includes a third sub-subpixel and a fourth sub-subpixel, and a data signal line subset further include a third data signal line and a fourth data signal line, the third sub-subpixel being connected to the third data signal line and the fourth sub-subpixel being connected to the fourth sub-subpixel, and
scanning signals are further inputted through the scanning signal line to the third sub-subpixel and the fourth sub-subpixel, a third data signal being inputted through the third data signal line to the third sub-subpixel, a fourth data signal being inputted through the fourth data signal line to the fourth sub-subpixels, and voltage value ranges of the third data signal and the fourth data signal being from 0.7aV to 1.3aV, a being a positive number.

20. The driving method according to claim 19, wherein a voltage of the third data signal, a voltage of the fourth data signal and a voltage of the second data signal are different from each other.

* * * * *